(12) United States Patent
Ma et al.

(10) Patent No.: US 10,921,033 B2
(45) Date of Patent: Feb. 16, 2021

(54) HORIZONTAL GAS-LIQUID SEPARATOR FOR AIR CONDITIONER, AND AIR CONDITIONER

(71) Applicants: GD MIDEA HEATING & VENTILATING EQUIPMENT CO., LTD., Foshan (CN); MIDEA GROUP CO., LTD., Foshan (CN)

(72) Inventors: Lihua Ma, Foshan (CN); Mingren Wang, Foshan (CN); Guozhong Yang, Foshan (CN); Libo Yan, Foshan (CN)

( * ) Notice: Subject to any disclaimer, the term of this patent is extended or adjusted under 35 U.S.C. 154(b) by 121 days.

(21) Appl. No.: 16/282,302

(22) Filed: Feb. 22, 2019

(65) Prior Publication Data

US 2019/0186794 A1    Jun. 20, 2019

Related U.S. Application Data

(63) Continuation of application No. PCT/CN2016/106935, filed on Nov. 23, 2016.

(30) Foreign Application Priority Data

Aug. 22, 2016   (CN) .......................... 201620918868.4

(51) Int. Cl.
*F25B 43/00*   (2006.01)
*B01D 45/00*   (2006.01)
*F25B 40/00*   (2006.01)

(52) U.S. Cl.
CPC .............. *F25B 43/00* (2013.01); *B01D 45/00* (2013.01); *F25B 40/00* (2013.01)

(58) Field of Classification Search
CPC .......... B01D 45/00; B25B 43/00; B25B 40/00
See application file for complete search history.

(56) References Cited

U.S. PATENT DOCUMENTS

| | | | |
|---|---|---|---|
| 4,906,264 A | | 3/1990 | Szymaszek et al. |
| 6,742,356 B2 * | | 6/2004 | Saito ........................ F25B 41/00 62/116 |

FOREIGN PATENT DOCUMENTS

| | | |
|---|---|---|
| CN | 102788458 A | 11/2012 |
| CN | 204757482 U | 11/2015 |
| CN | 205957565 U | 2/2017 |

(Continued)

OTHER PUBLICATIONS

The Office Action dated May 15, 2019 in the corresponding EP application No. 16914024.1.

(Continued)

*Primary Examiner* — Ana M Vazquez (74) *Attorney, Agent, or Firm* — Kilpatrick Townsend & Stockton, LLP (57) ABSTRACT

A horizontal gas-liquid separator for an air conditioner includes a housing and a refrigerant inlet pipe. The housing defines a cavity. The cavity has a gas outlet formed in the top of the cavity and a liquid outlet formed in the bottom of the cavity. A minimum distance between the gas outlet and a left sidewall of the cavity is denoted by L1, and a minimum distance between the liquid outlet and the left sidewall of the cavity is denoted by L2. The refrigerant inlet pipe is located on a left side wall of the housing and has an end extending into the cavity. A distance between an end face of the end of the refrigerant inlet pipe and the left sidewall of the cavity is denoted by L3, and L3≥L1, L3≥L2.

16 Claims, 5 Drawing Sheets

(56) References Cited

FOREIGN PATENT DOCUMENTS

| | | |
|---|---|---|
| JP | 20000320933 A | 11/2000 |
| JP | 2003240385 A | 8/2003 |
| JP | 2011247575 A | 12/2011 |

OTHER PUBLICATIONS

International Search Report dated Jun. 7, 2017 in the corresponding International Application No. PCT/CN2016/106935.

* cited by examiner

HORIZONTAL GAS-LIQUID SEPARATOR FOR AIR CONDITIONER, AND AIR CONDITIONER

RELATED APPLICATIONS

This application is a continuation of International Application No. PCT/CN2016/106935, filed on Nov. 23, 2016, which claims priority to Chinese Patent Application No. 201620918868.4, filed with the Chinese Patent Office on Aug. 22, 2016, and entitled "HORIZONTAL GAS-LIQUID SEPARATOR FOR AIR CONDITIONER, AND AIR CONDITIONER", which is incorporated herein by reference in their entirety.

FIELD

The present disclosure relates to the field of household appliances, more particularly to a horizontal gas-liquid separator for an air conditioner, and an air conditioner.

BACKGROUND

In the related art, a gas-liquid separator for air conditioning generally employs a vertical structure, enabling separation of gas and liquid mainly depending on the action of gravity and centrifugal force. Due to limitation of the structure height space, if a tank of a vertical gas-liquid separator has a height that cannot reach the required height, the effect of gas-liquid separation will become worse, and the requirement of the gas-liquid separation cannot be satisfied.

SUMMARY

Embodiments of the present disclosure seek to solve at least one of the problems existing in the related art to at least some extent. To this end, the present disclosure proposes a horizontal gas-liquid separator for an air conditioner with good separation effect and occupies a smaller space.

The present disclosure further proposes an air conditioner including the above horizontal gas-liquid separator.

The horizontal gas-liquid separator according to embodiments of the present disclosure includes a housing and a refrigerant inlet pipe. The housing defines a cavity, the cavity has a gas outlet formed in a top of the cavity and a liquid outlet formed in a bottom of the cavity. A minimum distance between the gas outlet and a left sidewall of the cavity is denoted by L1, and a minimum distance between the liquid outlet and the left sidewall of the cavity being denoted by L2. The refrigerant inlet pipe is located on a left side wall of the housing and has an end extending into the cavity. A distance between an end face of the end of the refrigerant inlet pipe and the left sidewall is denoted by L3, and the L3 is greater than or equal to the L1, the L3 is greater than or equal to the L2.

In the horizontal gas-liquid separator according to embodiments of the present disclosure, the minimum distance between the gas outlet and the left sidewall of the cavity is denoted by L1, and the minimum distance between the liquid outlet and the left sidewall of the cavity is denoted by L2. The refrigerant inlet pipe is located on the left side wall of the housing and has the end extending into the cavity. The distance between an end face of an outlet end of the refrigerant inlet pipe and the left sidewall is denoted by L3, and the L3 is greater than or equal to the L1, the L3 is greater than or equal to the L2. Thus, the gas outlet and the liquid outlet can be located on the left side of an outlet of the refrigerant inlet pipe. The refrigerant enters the cavity via the refrigerant inlet pipe, flows from left to right within the housing, and turns back after reaching a right side wall of the housing, such that separation stroke and separation time of the gas-liquid mixed refrigerant are increased to achieve better separation effect. Finally, the separated refrigerant gas flows out through the gas outlet, and the refrigerant liquid flows out through the liquid outlet.

According to some embodiments of the present disclosure, an inner diameter of the gas outlet is denoted by D5, a maximum vertical distance between the gas outlet and the left sidewall of the cavity is denoted by La, and the La, the L3 and the D5 satisfy: $D5 \leq La \leq L3+D5/2$.

According to some embodiments of the present disclosure, a maximum vertical distance between the liquid outlet and the left sidewall of the cavity is denoted by Lb, and the Lb is less than or equal to the L3.

According to some embodiments of the present disclosure, a portion of the refrigerant inlet pipe extending into the cavity is inclined towards a bottom wall of the cavity from left to right.

According to some embodiments of the present disclosure, a centerline of the portion of the refrigerant inlet pipe extending into the cavity is a centerline m, an included angle between the centerline m and the bottom wall of the cavity is denoted by $\alpha$, and the $\alpha$ satisfies: $0° < \alpha \leq 30°$.

According to some embodiments of the present disclosure, the end of the refrigerant inlet pipe has an elbow section, and the elbow section is gradually bent downwards in a direction from a fixed end of the elbow section to a free end of the elbow section.

According to some embodiments of the present disclosure, the horizontal gas-liquid separator further includes a partition plate disposed in the cavity, the partition plate is located on a right side of the gas outlet to divide the cavity into a plurality of sub-cavities arranged in a left-right direction, and the partition plate defines a penetrating hole communicating two adjacent sub-cavities.

According to some embodiments of the present disclosure, a plurality of partition plates are provided and spaced apart in the left-right direction.

According to some embodiments of the present disclosure, the partition plate defines a central through hole in the middle of the partition plate, and the central through hole is opposite to the end of the refrigerant inlet pipe.

According to some embodiments of the present disclosure, a diameter of the central through hole is denoted by D1, an outer diameter of the partition plate is denoted by D2, and the D1 and D2 satisfy: $0.15 \leq D1/D2 \leq 0.85$.

According to some embodiments of the present disclosure, the partition plate defines a notch at an outer peripheral edge of the partition plate, a maximum depth of the notch is denoted by H, a diameter of the central through hole is denoted by D1, an outer diameter of the partition plate is denoted by D2, and the H, the D1 and the D2 satisfy: $0.01(D2-D1) \leq H \leq 0.25(D2-D1)$.

According to some embodiments of the present disclosure, a plurality of notches are provided.

According to some embodiments of the present disclosure, two notches are provided, one of the two notches is located near a top wall of the cavity, and the other of the two notches is located near a bottom wall of the cavity.

According to some embodiments of the present disclosure, a vertical distance between the end of the refrigerant inlet pipe and the partition plate is denoted by L4, a diameter of the central through hole is denoted by D1, an inner diameter of the end of the refrigerant inlet pipe is denoted by D3, and the D1 and the D3 satisfy: $0 \leq D1-D3 \leq 2\sqrt{3} \cdot L4$.

According to some embodiments of the present disclosure, an outer diameter of the partition plate is denoted by D2, an inner diameter of the cavity is denoted by D4, and the D2 and the D4 satisfy that the D2 is less than or equal to the D4.

According to some embodiments of the present disclosure, the penetrating hole is a circular hole, an elliptical hole or a polygonal hole.

The air conditioner according to embodiments of the present disclosure includes the above horizontal gas-liquid separator for an air conditioner.

For the air conditioner according to embodiments of the present disclosure, by providing the above horizontal gas-liquid separator, the space occupied by the air conditioner in a vertical direction can be reduced. Furthermore, the horizontal gas-liquid separator can increase the gas-liquid separation stroke and separation time so as to achieve better separation effect, thereby further improving overall performance of the air conditioner.

BRIEF DESCRIPTION OF THE DRAWINGS

Embodiments of the present disclosure will become apparent and more readily appreciated from the following descriptions made with reference to the drawings, in which.

REFERENCE NUMERALS

Gas-liquid separator 100,
Housing 10, cavity 110, gas outlet 111, liquid outlet 112,
Refrigerant inlet pipe 120,
Partition plate 130, central through hole 131, notch 132, penetrating hole 133.

DETAILED DESCRIPTION

Reference will be made in detail to embodiments of the present disclosure, and examples of the embodiments are shown in the accompanying drawings. The embodiments described herein with reference to drawings are exemplary, and used to generally understand the present disclosure. The embodiments shall not be construed to limit the present disclosure.

In the specification, unless specified or limited otherwise, relative terms such as "central", "upper", "lower", "front", "rear", "right", "left", "top", "bottom", "inner", "outer" should be construed to refer to the orientation as then described or as shown in the drawings under discussion. These relative terms are for convenience and simplification of description and do not require that the present disclosure be constructed or operated in a particular orientation.

In addition, terms such as "first" and "second" are used herein for purposes of description and are not intended to indicate or imply relative importance or significance or to imply the number of indicated features. Thus, the feature defined with "first" and "second" may comprise one or more of this feature. In the description of the present disclosure, the term "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications or interactions of two elements.

A horizontal gas-liquid separator 100 for an air conditioner according to embodiments of the present disclosure will be described below with reference to FIGS. 1 to 9.

As illustrated in FIGS. 1 to 9, the horizontal gas-liquid separator 100 according to embodiments of the present disclosure includes a housing 10 and a refrigerant inlet pipe 120.

Figure 1:
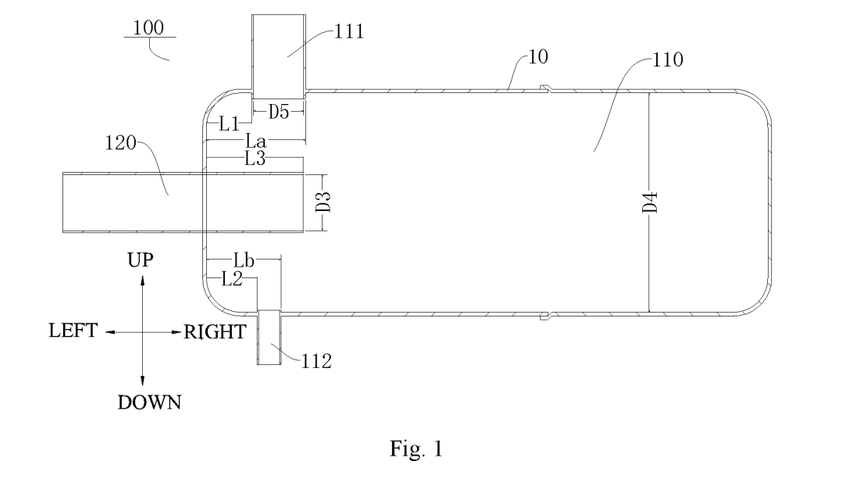
FIG. 1 is a sectional view of a horizontal gas-liquid separator for an air conditioner according to an embodiment of the present disclosure.

In one embodiment, as illustrated in FIG. 1, the housing 10 defines a cavity 110. The cavity 110 has a gas outlet 111 formed in a top of the cavity 110 and a liquid outlet 112 formed in a bottom of the cavity 110. A minimum distance between the gas outlet 111 and a left sidewall of the cavity 110 is denoted by L1, and a minimum distance between the liquid outlet 112 and the left sidewall of the cavity 110 is denoted by L2. The refrigerant inlet pipe 120 is located on a left side wall of the housing 10, and an end of the refrigerant inlet pipe 120 extends into the cavity 110. A distance between an end face of the end of the refrigerant inlet pipe 120 and the left sidewall is denoted by L3, and $L3 \geq L1$, $L3 \geq L2$.

It could be understood that, a gas-liquid mixed refrigerant enters the cavity 110 via the refrigerant inlet pipe 120, and flows from left to right (left and right directions as shown in FIG. 1). In the flowing process, the gas-liquid mixed refrigerant is preliminarily separated. Under the action of the refrigerant's own weight, a part of liquid refrigerant flows towards the bottom of the cavity 110, and a part of gaseous refrigerant flows towards an upper portion of the cavity 110. When the gas-liquid mixed refrigerant strikes on a surface of a right sidewall of the cavity 110, a majority of liquid refrigerant is attached to the right sidewall of the cavity 110, the liquid refrigerant collects and flows towards a bottom wall of the cavity 110 under the action of gravity, and turns back from right to left (left and right directions as shown in FIG. 1) and flows towards a position of the liquid outlet 112. A majority of gaseous refrigerant turns back from right to left (left and right directions as shown in FIG. 1) after striking on the right sidewall of the cavity 110, and flows towards the gas outlet 111. In the process of the gaseous refrigerant flowing towards the gas outlet 111, a small amount of liquid refrigerant entrained in the gaseous refrigerant is separated from the gaseous refrigerant under the action of the gravity, drips down onto the bottom wall of the cavity 110 and flows towards the liquid outlet 112, thereby realizing separation of gas-liquid mixed refrigerant.

In the horizontal gas-liquid separator 100 according to embodiments of the present disclosure, the minimum distance between the gas outlet 111 and the left sidewall of the cavity 110 is denoted by L1, and the minimum distance between the liquid outlet 112 and the left sidewall of the cavity 110 is denoted by L2. The refrigerant inlet pipe 120 is located on the left side wall of the housing 10 and has the end extending into the cavity 110. The distance between the end face of an outlet end of the refrigerant inlet pipe 120 and the left sidewall is denoted by L3, and L3≥L1, L3≥L2. Thus, the gas outlet 111 and the liquid outlet 112 can be located on the left side of an outlet of the refrigerant inlet pipe 120. Thus, the refrigerant enters the cavity 110 via the refrigerant inlet pipe 120, flows from left to right within the housing 10, and turns back after reaching a right side wall of the housing 10, such that separation stroke and separation time of the gas-liquid mixed refrigerant are increased to achieve better separation effect. Finally, the separated refrigerant gas flows out through the gas outlet 111, and the refrigerant liquid flows out through the liquid outlet 112.

According to some embodiments of the present disclosure, as illustrated in FIGS. 1 to 9, an inner diameter of the gas outlet 111 is denoted by D5, a maximum vertical distance between the gas outlet 111 and the left sidewall of the cavity 110 is denoted by La, and the La, the L3 and the D5 satisfy: D5≤La≤L3+D5/2. Thus, the gas outlet 111 can be located on the left side direction (left and right directions as shown in FIGS. 1 to 9) of the outlet of the refrigerant inlet pipe 120. Therefore, the gaseous refrigerant entrained with liquid refrigerant component can be prevented from directly flowing out through the gas outlet 111 after the gas-liquid mixed refrigerant enters the cavity 110, which results in a phenomenon of poor gas-liquid separation effect. In some embodiments of the present disclosure, as illustrated in FIGS. 1, 2, 4 and 5, the refrigerant inlet pipe 120 is disposed on the left side wall of the housing 10. The refrigerant inlet pipe 120 has an end extending into an interior of the cavity 110, and a distance between the outlet end of the refrigerant inlet pipe 120 and the left sidewall of the cavity 110 is denoted by L3. The gas outlet 111 is disposed at upper left (up, down, left and right directions as shown in FIGS. 1, 2, 4, and 5) of the cavity 110, the distance between a right side edge of the gas outlet 111 and the left sidewall of the cavity 110 is denoted by La and satisfies: D5≤La≤L3+D5/2, so as to prevent the gaseous refrigerant entrained with liquid refrigerant component from directly flowing out through the gas outlet 111 after the gas-liquid mixed refrigerant enters the cavity 110, which results in the phenomenon of poor gas-liquid separation effect.

According to some embodiments of the present disclosure, as illustrated in FIGS. 1 to 9, a maximum vertical distance between the liquid outlet 112 and the left sidewall of the cavity 110 is denoted by Lb, and Lb≤L3. Thus, the liquid outlet 112 can be located on the left side direction (left and right directions as shown in FIGS. 1 to 9) of the outlet of the refrigerant inlet pipe 120, so as to prevent the gaseous refrigerant entrained with liquid refrigerant component from directly flowing out through the gas outlet 111 after the gas-liquid mixed refrigerant enters the cavity 110, which results in the phenomenon of poor gas-liquid separation effect. In some embodiments of the present disclosure, as illustrated in FIGS. 1, 2, 4 and 5, the refrigerant inlet pipe 120 is disposed on the left side wall of the housing 10. The refrigerant inlet pipe 120 has an end extending into an interior of the cavity 110, and the distance between the outlet end of the refrigerant inlet pipe 120 and the left sidewall of the cavity 110 is denoted by L3. The liquid outlet 112 is disposed at lower left (up, down, left and right directions as shown in FIGS. 1, 2, 4, and 5) of the cavity 110, the distance between a right side edge of the liquid outlet 112 and the left sidewall of the cavity 110 is denoted by Lb and satisfies: Lb≤L3, so as to prevent the gaseous refrigerant entrained with liquid refrigerant component from directly flowing out through the gas outlet 111 after the gas-liquid mixed refrigerant enters the cavity 110, which results in the phenomenon of poor gas-liquid separation effect.

Figure 8:
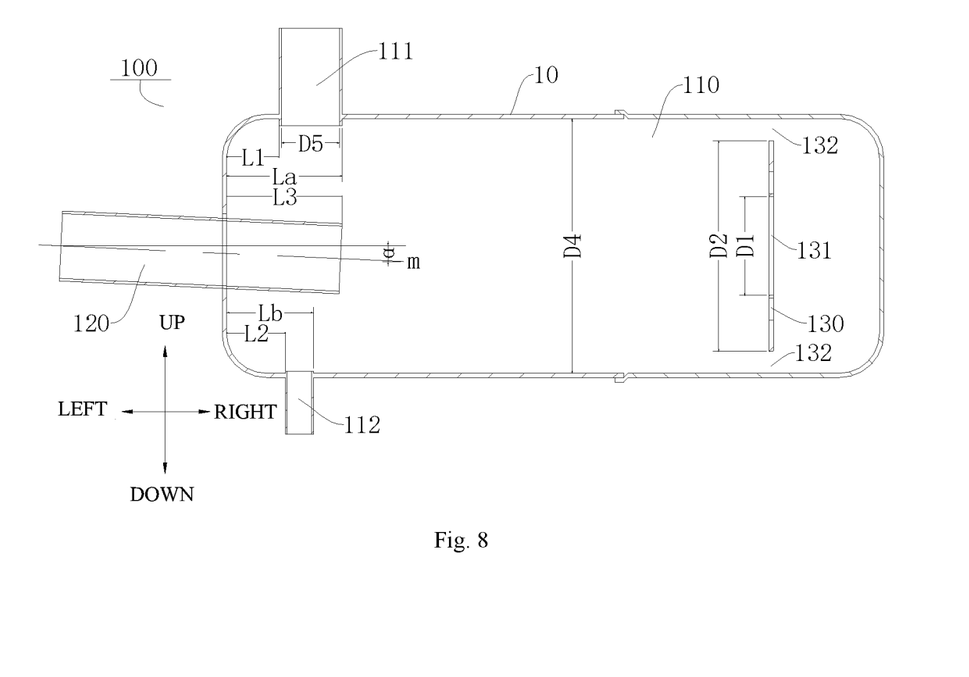
FIG. 8 is a sectional view of a horizontal gas-liquid separator for an air conditioner according to an embodiment of the present disclosure.

According to some embodiments of the present disclosure, as illustrated in FIG. 8, a portion of the refrigerant inlet pipe 120 extending into the cavity 110 is inclined towards a bottom wall of the cavity 110 from left to right (left and right directions as shown in FIG. 8). Thus, the gaseous refrigerant entrained with liquid refrigerant component can be further prevented from directly flowing out through the gas outlet 111 after the gas-liquid mixed refrigerant enters the cavity 110, which results in a phenomenon of poor gas-liquid separation effect. In some embodiments of the present disclosure, as illustrated in FIG. 8, the portion of the refrigerant inlet pipe 120 extending into the cavity 110 is inclined towards the bottom wall of the cavity 110 from left to right (left and right directions as shown in FIG. 8). Thus, it is ensured that the gas-liquid mixed refrigerant after entering the cavity 110 can flow to the right sidewall of the cavity 110 and turn back, so as to increase the gas-liquid separation stroke and improve the gas-liquid separation effect.

According to some embodiments of the present disclosure, as illustrated in FIG. 8, a centerline of the portion of the refrigerant inlet pipe 120 extending into the cavity 110 is a centerline m, an included angle between the centerline m and the bottom wall of the cavity 110 is denoted by α, and the α satisfies: 0°<α≤30°. Experimentally determined, when the α satisfies: 0°<α≤30°, it is fully ensured that the gas-liquid refrigerant after entering the cavity 110 can flow to the right sidewall of the cavity 110 and turns back, so as to increase the gas-liquid separation stroke. Finally, the separated gaseous refrigerant flows out through the gas outlet 111, and the liquid refrigerant flows out through the liquid outlet 112, thereby improving gas-liquid separation effect.

Figure 9:
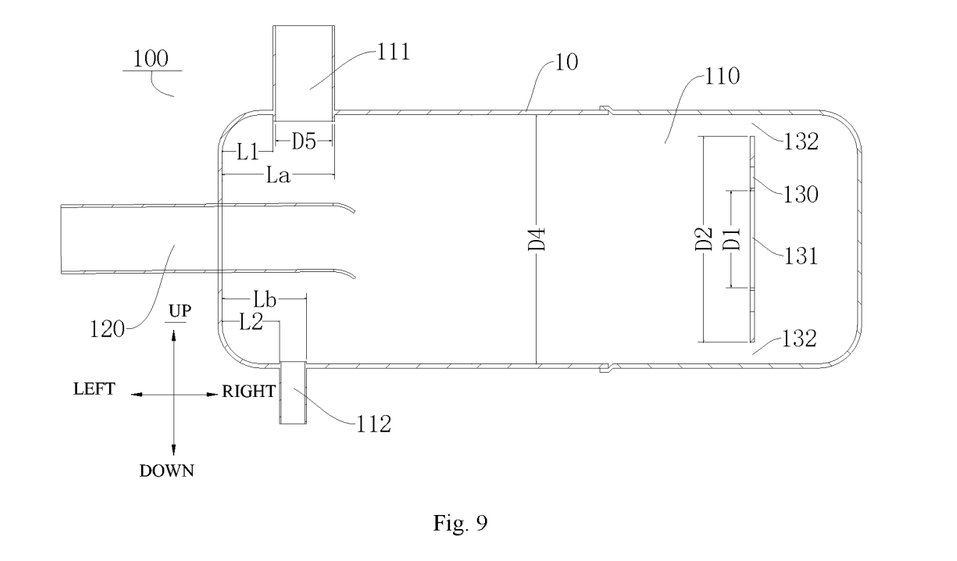
FIG. 9 is a sectional view of a horizontal gas-liquid separator for an air conditioner according to an embodiment of the present disclosure.

According to some embodiments of the present disclosure, as illustrated in FIG. 9, the end of the refrigerant inlet pipe 120 has an elbow section, and the elbow section is gradually bent downwards in a direction from a fixed end of the elbow section to a free end of the elbow section. Thus, the gaseous refrigerant entrained with liquid refrigerant component can be further prevented from directly flowing out through the gas outlet 111 after the gas-liquid mixed refrigerant enters the cavity 110, which results in a phenomenon of poor gas-liquid separation effect. In some embodiments of the present disclosure, as illustrated in FIG. 9, the out end of the refrigerant inlet pipe 120 has a bent section, and the bent section is connected to a straight pipe section in a smooth transition. Thus, after entering the cavity 110, the gas-liquid refrigerant can flow to the right sidewall of the cavity 110 in a lower-right direction (left and right directions as shown in FIG. 9) and turns back, so as to increase the gas-liquid separation stroke, and improve gas-liquid separation effect.

According to some embodiments of the present disclosure, as illustrated in FIGS. 2 to 9, the horizontal gas-liquid separator 100 further includes a partition plate 130 disposed in the cavity 110, the partition plate 130 is located on a right side of the gas outlet 111 to divide the cavity 110 into a plurality of sub-cavities 110 arranged in a left-right direction, and the partition plate 130 defines a penetrating hole 133 communicating two adjacent sub-cavities 110. Thus, gas-liquid two-phase refrigerant enters the cavity 110 via the refrigerant inlet pipe 120, and continues to advance due to inertia and pass through a hollow portion of the annular partition plate 130. In the process of the gas-liquid mixed refrigerant passing through the partition plate 130, a part of the liquid refrigerant is attached to the partition plate 130 and is separated from the gaseous refrigerant. The gas-liquid mixed refrigerant continues to flow to the right sidewall of the cavity 110 until the gas-liquid mixed refrigerant strikes on the right sidewall of the cavity 110 and the flow direction of the gas-liquid mixed refrigerant is changed. The flow direction of a majority of the gaseous refrigerant is turned to flow towards a side of the gas outlet 111. In the flowing process, the gaseous refrigerant encounters the annular partition plate 130 and passes the penetrating hole in the annular partition plate 130, and continues to flow towards the side of the gas outlet. A part of liquid refrigerant is attached to the surface of the right sidewall of the cavity 110 and a wall surface of the partition plate 130, collects and flows towards a side of the liquid outlet 112 under the action of gravity. Another part of liquid refrigerant is entrained by the gaseous refrigerant to flow towards the side of the gas outlet 111, separated from the gaseous refrigerant due to the action of gravity in the flowing process, and then flows to the liquid outlet 112.

Figure 4:
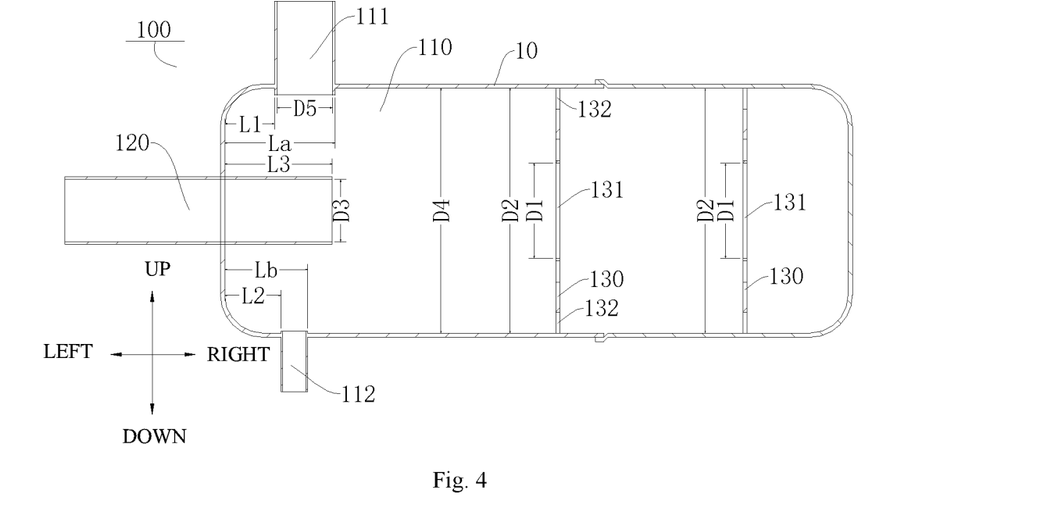
FIG. 4 is a sectional view of a horizontal gas-liquid separator for an air conditioner according to an embodiment of the present disclosure.

According to some embodiments of the present disclosure, as illustrated in FIG. 4, a plurality of partition plates 130 are provided and spaced apart in the left-right direction. Thus, the separation effect of the gas-liquid mixed refrigerant can be further enhanced. In some embodiments of the present disclosure, as illustrated in FIG. 4, two partition plates 130 are provided, and the two partition plates 130 are spaced apart in the left-right direction. Thus, in the flowing process of the gas-liquid mixed refrigerant, the liquid refrigerant can be attached to wall surfaces of the two partition plates 130. Under the action of gravity, the liquid refrigerant collects and flows to the side of the liquid outlet 112, thereby further improving the separation effect of the gas-liquid refrigerant.

Figure 2:
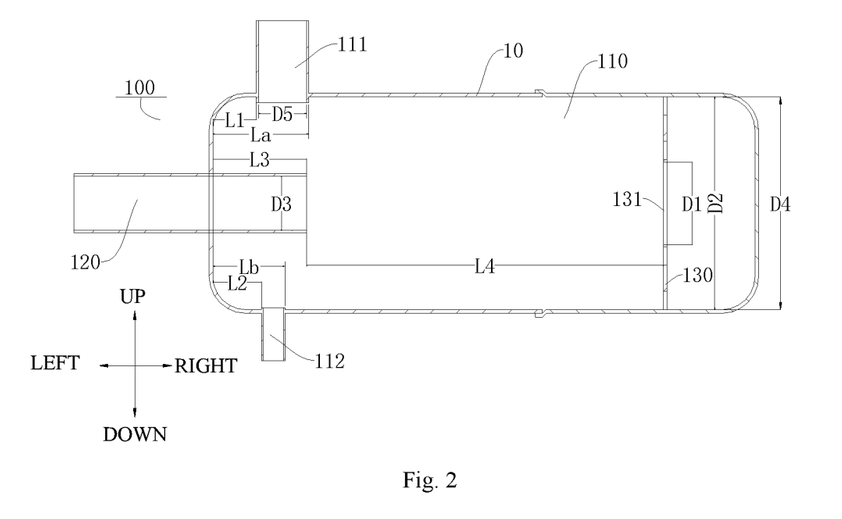
FIG. 2 is a sectional view of a horizontal gas-liquid separator for an air conditioner according to an embodiment of the present disclosure.
Figure 3:
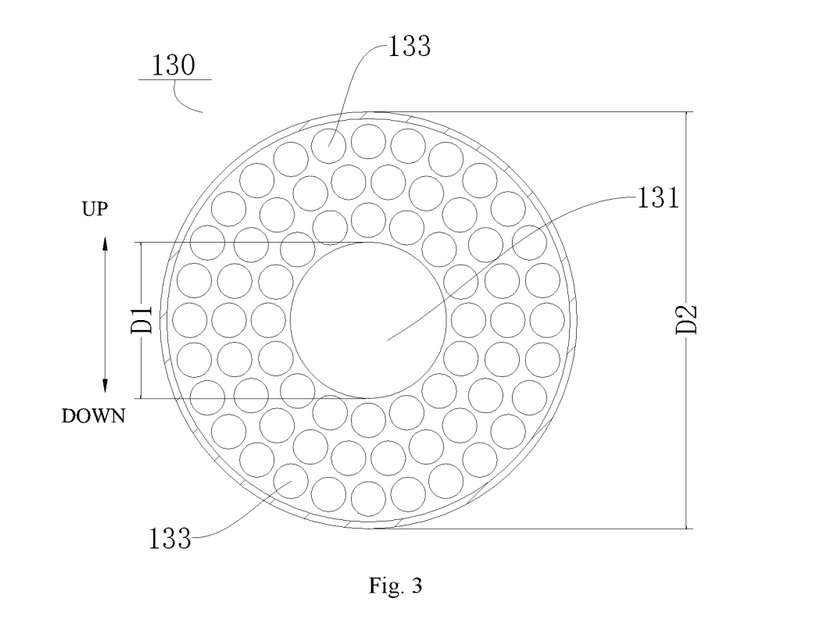
FIG. 3 is a partial sectional view of a horizontal gas-liquid separator for an air conditioner according to an embodiment of the present disclosure.
Figure 5:
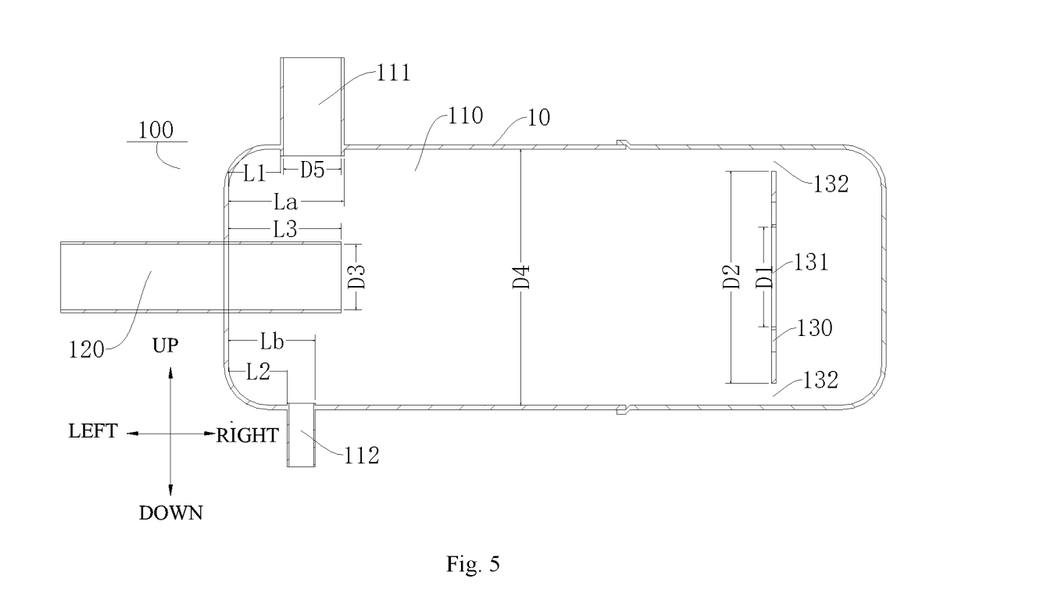
FIG. 5 is a sectional view of a horizontal gas-liquid separator for an air conditioner according to an embodiment of the present disclosure.
Figure 6:
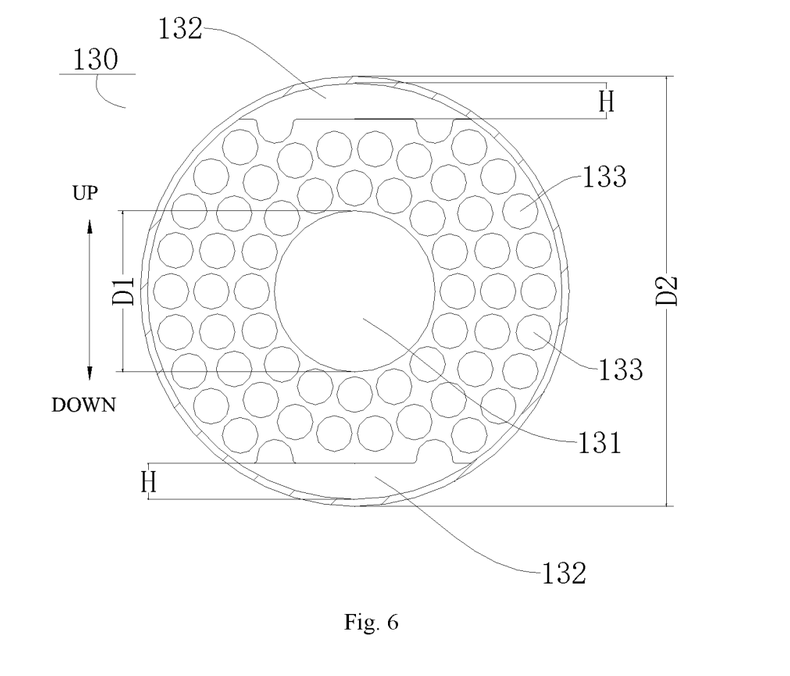
FIG. 6 is a partial sectional view of a horizontal gas-liquid separator for an air conditioner according to an embodiment of the present disclosure.
Figure 7:
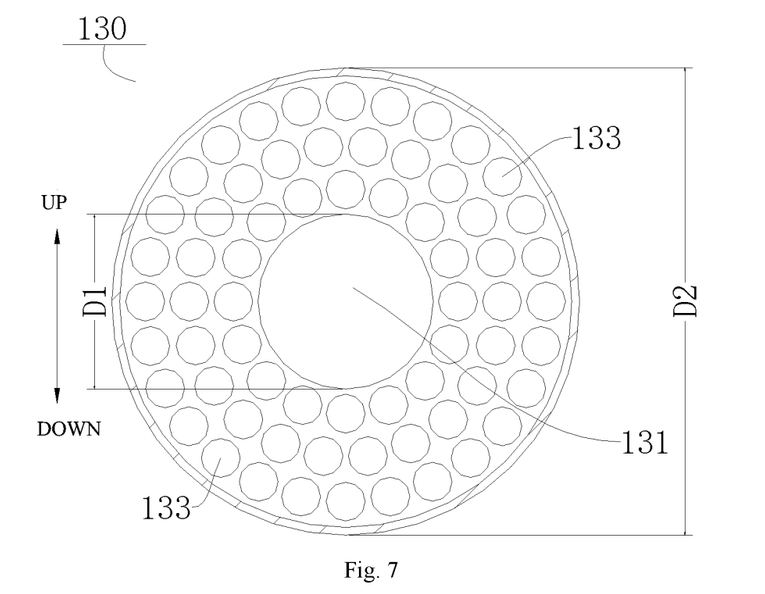
FIG. 7 is a partial sectional view of a horizontal gas-liquid separator for an air conditioner according to an embodiment of the present disclosure.

According to some embodiments of the present disclosure, as illustrated in FIGS. 2 to 9, the partition plate 130 defines a central through hole 131 in the middle of the partition plate 130, and the central through hole 131 is opposite to the end of the refrigerant inlet pipe 120. Thus, the gas-liquid mixed refrigerant can enter the cavity 110 via the refrigerant inlet pipe 120, reach the right sidewall of the cavity 110 through the central through hole 131 and turns back. A part of the liquid refrigerant will be attached to the partition plate 130 and separated from the gaseous refrigerant when the gas-liquid mixed refrigerant flows to partition plate 130. In some embodiments of the present disclosure, as illustrated in FIGS. 3 and 7, the partition plate 130 is configured as an annular partition plate 130. The partition plate 130 defines a central through hole 131 in the middle of the partition plate 130, and the partition plate 130 also defines many small circular penetrating holes 133, thereby facilitating the gaseous refrigerant passing through the partition plate 130. When the gaseous refrigerant passes through the partition plate 130, the liquid refrigerant entrained in the gaseous refrigerant can be attached to the wall surface of the partition plate 130. The liquid refrigerant attached to the partition plate 130 is collected to the liquid outlet 112 under the action of gravity, while the gaseous refrigerant flows to the gas outlet 111, thereby realizing the separation of the gas-liquid mixed refrigerant.

Further, according to some embodiments of the present disclosure, a diameter of the central through hole 131 is denoted by D1, an outer diameter of the partition plate 130 is denoted by D2, and the D1 and D2 satisfy: $0.15 \leq D1/D2 \leq 0.85$. Experimentally determined, when the D1 and D2 satisfy: $0.15 \leq D1/D2 \leq 0.85$, the gas-liquid mixed refrigerant entering the cavity 110 can pass through the through hole of the partition plate 130 and strikes on the right sidewall of the cavity 110 and turns back. In the flowing process of the gas-liquid mixed refrigerant, the liquid refrigerant is attached to the wall surface of the cavity 110 and the wall surface of the partition plate 130, collects and flows to the liquid outlet 112 under the action of gravity. The gaseous refrigerant flows out through the gas outlet 111, thereby realizing the gas-liquid separation effect.

According to some embodiments of the present disclosure, as illustrated in FIGS. 4 to 7, the partition plate 130 defines a notch 132 at an outer peripheral edge of the partition plate, a maximum depth of the notch 132 is denoted by H, a diameter of the central through hole 131 is denoted by D1, an outer diameter of the partition plate 130 is denoted by D2, and the H, the D1 and the D2 satisfy: $0.01(D2-D1) \leq H \leq 0.25(D2-D1)$. Thus, in the process of the gas-liquid mixed refrigerant passing through the notch 132 of the partition plate 130, the liquid refrigerant will be attached to the partition plate 130 for further separation. Moreover, the gaseous refrigerant and the liquid refrigerant that are turned back by striking on the right sidewall of the cavity 110 can flow to the gas outlet 111 and the liquid outlet 112 through the notch 132. In some embodiments of the present disclosure, a shape of the notch 132 may be designed to be triangular, rectangular or other irregular shapes.

According to some embodiments of the present disclosure, as illustrated in FIG. 6, a plurality of notches are provided. It should note that, in the process of the gas-liquid mixed refrigerant passing through the partition plate 130, a part of the liquid refrigerant will be attached to the partition plate 130 and preliminarily separated from the gaseous refrigerant. The gas-liquid mixed refrigerant continues to flow to the right, after striking on the surface of the right sidewall of the cavity 110, a majority of liquid refrigerant is attached to the right sidewall of the cavity 110 and separated from the gaseous refrigerant. The gaseous refrigerant entrained with a small amount of liquid refrigerant flows to the partition plate 130, the separation of the liquid refrigerant from the gaseous refrigerant occurs again at the notch 132 of the partition plate 130. The majority of gaseous refrigerant passes through the notch 130 of the partition plate and flows to the gas outlet 111, the liquid refrigerant attached to the partition plate 130 collects and flows to the liquid outlet 112 under the action of gravity.

In some embodiments of the present disclosure, two notches 132 may be provided, one of the two notches 132 is located near a top wall of the cavity 110, and the other of the two notches 132 is located near a bottom wall of the cavity 110. In some embodiments of the present disclosure, as illustrated in FIG. 6, two notches 132 may be provided, the two notches 132 are disposed at an upper end and a lower end (up and down directions as shown in FIG. 6) of the partition plate 130 respectively. The gas-liquid mixed refrigerant entering the cavity 110 passes through the partition plate 130 under the action of the inertia force, flows to the right side of the cavity 110, and turns back after striking on the right sidewall of the cavity 110. The majority of the liquid refrigerant is attached to the surface of the right sidewall of the cavity 110 and the partition plate 130, and flows to the bottom wall (a lower wall surface of the cavity 110 as shown in FIG. 6) of the cavity 110 under the action of gravity. The liquid refrigerant flows towards the liquid outlet 112, the notch 132 is provided at a lower portion of the partition plate 130, thereby facilitating flow of the liquid refrigerant to the liquid outlet 112. The gaseous refrigerant flows from an upper portion of the cavity 110 towards the gas outlet 111, the notch 132 is provided at an upper portion of the partition plate 130, thereby facilitating outflow of the gaseous refrigerant. Furthermore, in the process of the gaseous refrigerant passing through the notch 132 of the partition plate 130, the entrained liquid refrigerant will be attached to the partition plate 130, thereby realizing further separation of the gas-liquid refrigerant.

According to some embodiments of the present disclosure, a vertical distance between the end of the refrigerant inlet pipe 120 and the partition plate 130 is denoted by L4, a diameter of the central through hole 131 is denoted by D1, an inner diameter of the end of the refrigerant inlet pipe 120 is denoted by D3, and the D1 and the D3 satisfy: $0 \leq D1 - D3 \leq 2\sqrt{3} \cdot L4$. Experimentally determined, when the D1, D3 and D4 satisfy $0 \leq D1 - D3 \leq 2\sqrt{3} \cdot L4$, is ensured that the gas-liquid mixed refrigerant entering the cavity 110 via the refrigerant inlet pipe 120 can pass through the central through hole 131 and flow to the right sidewall of the cavity 110.

According to some embodiments of the present disclosure, as illustrated in FIG. 7, an outer diameter of the partition plate 130 is denoted by D2, an inner diameter of the cavity 110 is denoted by D4, and the D2 and the D4 satisfy: $D2 \leq D4$. Thus, the partition plate 130 and an inner wall of the cavity 110 can define a gap therebetween. Thereby, it is convenient for the gaseous refrigerant and the liquid refrigerant that are turned back to pass through the gap, and flow to the gas outlet 111 and the liquid outlet 112 respectively. In some embodiments of the present disclosure, as illustrated in FIGS. 7 and 8, the outer diameter of the partition plate 130 is set to be less than the inner diameter of the cavity 110, such that the partition plate 130 and the inner wall of the cavity 110 can define a clearance therebetween, thereby facilitating flow of the gaseous refrigerant and liquid refrigerant to the gas outlet 111 and the liquid outlet 112 respectively.

According to some embodiments of the present disclosure, as illustrated in FIGS. 3, 6 and 7, the penetrating hole 133 is a circular hole, an elliptical hole or a polygonal hole. Thus, the manufacture of the penetrating hole 133 can be facilitated. According to some embodiments of the present disclosure, as illustrated in FIGS. 3, 6 and 7, the penetrating hole 133 may be designed to e circular, so as to facilitate process and manufacture of the penetrating hole 133. In some other embodiments of the present disclosure, the penetrating hole 133 may also be designed to be an elliptical hole or other polygonal holes.

The horizontal gas-liquid separator 100 for the air conditioner according to embodiments of the present disclosure will be described in detail by means of some embodiments below with reference to FIGS. 1 to 9. It could be understood that, the following description is exemplary illustration, but does not In one embodiment limit the present disclosure.

Embodiment 1

As shown in FIG. 1, the horizontal gas-liquid separator 100 according to embodiments of the present disclosure includes the housing 10 and the refrigerant inlet pipe 120.

The housing 10 defines the cavity 110, the cavity 110 has the gas outlet 111 formed in the top of the cavity 110 and the liquid outlet 112 formed in the bottom of the cavity 110. The minimum distance between the gas outlet 111 and the left sidewall of the cavity 110 is denoted by L1, and the minimum distance between the liquid outlet 112 and the left sidewall of the cavity 110 is denoted by L2. The refrigerant inlet pipe 120 is located on the left side wall of the housing 10 and has an end extending into the cavity 110. The distance between the end face of the outlet end of the refrigerant inlet pipe 120 and the left sidewall is denoted by L3, and $L3 \geq L1$, $L3 \geq L2$. The maximum vertical distance between the gas outlet 111 and the left sidewall of the cavity 110 is denoted by La, and the inner diameter of the gas outlet is denoted by D5, satisfying: $D5 \leq La \leq L3 + D5/2$. The maximum vertical distance between the liquid outlet 112 and the left sidewall of the cavity 110 is denoted by Lb, satisfying: $Lb \leq L3$.

Thus, by means of the above dimension relationship design for positions of the refrigerant inlet pipe 120, the gas outlet 111 and the liquid outlet 112, the gas outlet 111 and the liquid outlet 112 can be located on the left side of the outlet of the refrigerant inlet pipe 120. Thus, the refrigerant enters the cavity 110 via the refrigerant inlet pipe 120, flows from left to right within the housing 10, and turns back after reaching the right side wall of the housing 10, thereby increasing the separation stroke of the gas-liquid mixed refrigerant to achieve better separation effect. Finally, the separated refrigerant gas flows out through the gas outlet 111, and the refrigerant liquid flows out through the liquid outlet 112.

Embodiment 2

As illustrated in FIGS. 2 to 4, the difference from Embodiment 1 in this embodiment is that: the horizontal gas-liquid separator 100 further includes the partition plate 130. The partition plate 130 is disposed in the cavity 110, and the partition plate 130 is located on the right side of the gas outlet 111 to divide the cavity 110 into a plurality of sub-cavities 110 arranged in the left-right direction. The partition plate 130 defines the penetrating hole 133 communicating two adjacent sub-cavities 110, and the penetrating hole 133 is circular. The partition plate 130 defines the central through hole 131 in the middle thereof, and the central through hole 131 is opposite to the end of the refrigerant inlet pipe 120. The diameter of the central through hole 131 is denoted by D1, the outer diameter of the partition plate 130 is denoted by D2, and the D1 and D2 satisfy: $0.15 \leq D1/D2 \leq 0.85$. The vertical distance between the end of the refrigerant inlet pipe 120 and the partition plate 130 is denoted by L4, the diameter of the central through hole 131 is denoted by D1, the inner diameter of the end of the refrigerant inlet pipe 120 is denoted by D3, and the D1 and the D3 satisfy: $0 \leq D1 - D3 \leq 2\sqrt{3} \cdot L4$. One partition plate 130 may be provided (as illustrated in FIG. 2), or a plurality of partition plates 130 may be provided and spaced apart in the left-right direction (as illustrated in FIG. 4).

Thus, the gas-liquid two-phase refrigerant enters the cavity 110 via the refrigerant inlet pipe 120, continues to advance due to inertia to pass through the central through hole 131 of the annular partition plate 130, until striking on the right sidewall of the cavity 110 opposite to the inlet. The flow direction of the gas-liquid mixed refrigerant is turned after the striking, the flow direction of the gaseous refrigerant is turned to flow from right to left (left and right directions as illustrated in FIG. 4), to the side of the gas outlet 111. In the flowing process, the gaseous refrigerant encounters the annular partition plate 130, passes through the central through hole 131 in the annular partition plate 130, and continues to flow to the side of the gas outlet 111. A part of the liquid refrigerant is attached to the surface of the right sidewall of the cavity 110 and the wall surface of the partition plate 130, and collects and drips down onto the bottom of the cavity 110 under the action of gravity. The liquid refrigerant dripping down onto the bottom of the cavity 110 flows from right to left (left and right directions as illustrated in FIG. 4) towards the side of the liquid outlet 112. Another part of the liquid refrigerant entrained in the gaseous refrigerant flows to the side of the gas outlet 111, in the flowing process, the liquid refrigerant is separated from the gaseous refrigerant due to the action of the gravity, and then flows to the liquid outlet 112, thereby improving the separation effect of the gas-liquid mixed refrigerant.

Embodiment 3

As illustrated in FIGS. 5 to 7, the difference from Embodiment 2 in this embodiment is that: the partition plate 130 defines the notch 132 at the outer peripheral edge of the partition plate. The maximum depth of the notch 132 is denoted by H, the diameter of the central through hole 131 is denoted by D1, the outer diameter of the partition plate 130 is denoted by D2, and the H, D1 and D2 satisfy: $0.01(D2-D1) \leq H \leq 0.25(D2-D1)$. As illustrated in FIG. 6, two notches 132 are provided, one of the two notches 132 is located near the top wall of the cavity 110, and the other of the two notches 132 is located near the bottom wall of the cavity 110. As illustrated in FIG. 7, the partition plate 130 may also be configured such that the outer diameter of the partition plate 130 is denoted by D2, the inner diameter of the cavity 110 is denoted by D4, and the D2 and D4 satisfy: $D2 \leq D4$.

Thus, the gas-liquid mixed refrigerant entering the cavity 110 flows to the right side of the cavity 110 under the action of the inertia force, and turns back after striking on the right sidewall of the cavity 110. The majority of the liquid refrigerant is attached to the surface of the right sidewall of the cavity 110, and flows to the bottom wall (the lower wall surface of the cavity 110 as shown in FIG. 6) of the cavity 110 under the action of gravity. The liquid refrigerant flowing to the bottom wall flows towards the liquid outlet 112. The notch 132 is provided at the lower portion of the partition plate 130, thereby facilitating flow of the liquid refrigerant to the liquid outlet 112. The gaseous refrigerant flows from the upper portion of the cavity 110 towards the gas outlet 111, the notch 132 is provided at the upper portion of the partition plate 130, thereby facilitating outflow of gaseous refrigerant.

Embodiment 4

As illustrated in FIGS. 8 and 9, the difference from Embodiment 3 in this embodiment is that: the refrigerant inlet pipe 120 extends into the interior of the cavity 110, and the portion of the refrigerant inlet pipe extending into the cavity is inclined to the bottom wall of the cavity 110 from left to right. As illustrated in FIG. 8, the centerline of the portion of the refrigerant inlet pipe 120 extending into the cavity 110 is the centerline m, the included angle between the centerline m and the bottom wall of the cavity 110 is denoted by α, and the α satisfies: $0° < α \leq 30°$. As illustrated in FIG. 9, the end of the refrigerant inlet pipe 120 extending into the cavity 110 may also be provided with the elbow section, and the elbow section is gradually bent downwards in a direction from the fixed end of the elbow section to the free end of the elbow section.

Therefore, the gaseous refrigerant entrained with liquid refrigerant component can be prevented from directly flowing out through the gas outlet 111 after the gas-liquid mixed refrigerant enters the cavity 110, which results in a phenomenon of poor gas-liquid separation effect. The outlet end of the refrigerant inlet pipe 120 is configured to be inclined downwards, or the outlet end of the refrigerant inlet pipe 120 is configured to be in the form of the elbow section, it is thus ensured that the gas-liquid mixed refrigerant entering the cavity 110 can flow to the right sidewall of the cavity 110 and turn back to flow to the left (left and right directions as illustrated in FIGS. 8 and 9), so as to increase the separation stroke and improve the gas-liquid separation effect.

The air conditioner according to embodiments of the present disclosure includes the above-described horizontal gas-liquid separator.

For the air conditioner according to embodiments of the present disclosure, by providing the above-described horizontal gas-liquid separator, the space occupied by the air conditioner in the vertical direction can be reduced. Furthermore, the horizontal gas-liquid separator 100 for the air conditioner can increase the gas-liquid separation stroke and separation time, thereby improving the overall performance of the air conditioner.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure.

What is claimed is:

1. A horizontal gas-liquid separator for an air conditioner, comprising:
   a housing defining a cavity, the cavity has a gas outlet formed in a top of the cavity and a liquid outlet formed in a bottom of the cavity, a minimum distance between the gas outlet and a left sidewall of the cavity being denoted by L1, and a minimum distance between the liquid outlet and the left sidewall of the cavity being denoted by L2; and
   a refrigerant inlet pipe located on the left side wall of the housing and having an end extending into the cavity, a distance between an end face of the end of the refrigerant inlet pipe and the left sidewall being denoted by L3, and the L3 being greater than or equal to the L1, the L3 being greater than or equal to the L2;
   wherein an inner diameter of the gas outlet is denoted by D5, a maximum vertical distance between the gas outlet and the left sidewall of the cavity is denoted by La, and the La, the L3 and the D5 satisfy: $D5 \leq La \leq L3 + D5/2$.

2. The horizontal gas-liquid separator according to claim 1, wherein a maximum vertical distance between the liquid outlet and the left sidewall of the cavity is denoted by Lb, and the Lb is less than or equal to the L3.

3. The horizontal gas-liquid separator according to claim 1, wherein a portion of the refrigerant inlet pipe extending into the cavity is inclined towards a bottom wall of the cavity from left to right.

4. The horizontal gas-liquid separator according to claim 3, wherein a centerline of the portion of the refrigerant inlet pipe extending into the cavity is a centerline m, an included angle between the centerline m and the bottom wall of the cavity is denoted by $\alpha$, and the $\alpha$ satisfies: $0°<\alpha\leq30°$.

5. The horizontal gas-liquid separator according to claim 1, wherein the end of the refrigerant inlet pipe has an elbow section, and the elbow section is gradually bent downwards in a direction from a fixed end of the elbow section to a free end of the elbow section.

6. The horizontal gas-liquid separator according to claim 1, further comprising: a partition plate disposed in the cavity, the partition plate being located on a right side of the gas outlet to divide the cavity into a plurality of sub-cavities arranged in a left-right direction, and the partition plate defining a penetrating hole communicating two adjacent sub-cavities.

7. The horizontal gas-liquid separator according to claim 6, wherein a plurality of partition plates are provided and spaced apart in the left-right direction.

8. The horizontal gas-liquid separator according to claim 6, wherein the partition plate defines a central through hole in the middle of the partition plate, and the central through hole is opposite to the end of the refrigerant inlet pipe.

9. The horizontal gas-liquid separator according to claim 8, wherein a diameter of the central through hole is denoted by D1, an outer diameter of the partition plate is denoted by D2, and the D1 and D2 satisfy: $0.15\leq D1/D2\leq0.85$.

10. The horizontal gas-liquid separator according to claim 8, wherein the partition plate defines a notch at an outer peripheral edge of the partition plate, a maximum depth of the notch is denoted by H, a diameter of the central through hole is denoted by D1, an outer diameter of the partition plate is denoted by D2, and the H, the D1 and the D2 satisfy: $0.01(D2-D1)\leq H\leq0.25(D2-D1)$.

11. The horizontal gas-liquid separator according to claim 10, wherein a plurality of notches are provided.

12. The horizontal gas-liquid separator according to claim 10, wherein two notches are provided, one of the two notches is located near a top wall of the cavity, and the other of the two notches is located near a bottom wall of the cavity.

13. The horizontal gas-liquid separator according to claim 8, wherein a vertical distance between the end of the refrigerant inlet pipe and the partition plate is denoted by L4, a diameter of the central through hole is denoted by D1, an inner diameter of the end of the refrigerant inlet pipe is denoted by D3, and the D1 and the D3 satisfy: $0\leq D1-D3\leq 2\sqrt{3}\cdot L4$.

14. The horizontal gas-liquid separator according to claim 6, wherein an outer diameter of the partition plate is denoted by D2, an inner diameter of the cavity is denoted by D4, and the D2 and the D4 satisfy that the D2 is less than or equal to the D4.

15. The horizontal gas-liquid separator according to claim 6, wherein the penetrating hole is a circular hole, an elliptical hole or a polygonal hole.

16. An air conditioner, comprising:
a horizontal gas-liquid separator for the air conditioner, comprising:
a housing defining a cavity, the cavity has a gas outlet formed in a top of the cavity and a liquid outlet formed in a bottom of the cavity, a minimum distance between the gas outlet and a left sidewall of the cavity being denoted by L1, and a minimum distance between the liquid outlet and the left sidewall of the cavity being denoted by L2; and
a refrigerant inlet pipe located on a left side wall of the housing and having an end extending into the cavity, a distance between an end face of the end of the refrigerant inlet pipe and the left sidewall being denoted by L3, and the L3 being greater than or equal to the L1, the L3 being greater than or equal to the L2;
wherein an inner diameter of the gas outlet is denoted by D5, a maximum vertical distance between the gas outlet and the left sidewall of the cavity is denoted by La, and the La, the L3 and the D5 satisfy: $D5\leq La\leq L3+D5/2$.

* * * * *